US006893322B2

(12) United States Patent
Kordonski et al.

(10) Patent No.: US 6,893,322 B2
(45) Date of Patent: May 17, 2005

(54) METHOD AND APPARATUS FOR MEASURING AND CONTROLLING SOLIDS COMPOSITION OF A MAGNETORHEOLOGICAL FLUID

(75) Inventors: William Kordonski, Webster, NY (US); Michael Natkin, Fairport, NY (US); Sergei Gorodkin, Rochester, NY (US)

(73) Assignee: QED Technologies, Inc., Rochester, NY (US)

( * ) Notice: Subject to any disclaimer, the term of this patent is extended or adjusted under 35 U.S.C. 154(b) by 0 days.

(21) Appl. No.: 10/845,804

(22) Filed: May 14, 2004

(65) Prior Publication Data

US 2004/0266319 A1    Dec. 30, 2004

Related U.S. Application Data

(63) Continuation-in-part of application No. 09/862,245, filed on May 22, 2001.

(51) Int. Cl.[7] .............................................. B49D 1/00

(52) U.S. Cl. ................... 451/5; 451/8; 451/36; 451/38; 451/60; 451/87; 451/91; 451/93; 451/101; 451/102; 137/909

(58) Field of Search ........................... 451/825, 36, 38, 451/60, 87, 91, 93, 101, 102; 137/909

(56) References Cited

U.S. PATENT DOCUMENTS

| 5,951,369 | A | | 9/1999 | Kordonski et al. |
| 5,971,835 | A | | 10/1999 | Kordonski et al. |
| 6,158,470 | A | * | 12/2000 | Ivers et al. ................. 137/807 |
| 6,650,108 | B2 | | 11/2003 | Carlson et al. |
| 2002/0177392 | A1 | | 11/2002 | Kordonski et al. |

* cited by examiner

*Primary Examiner*—Joseph J. Hail, III
*Assistant Examiner*—Shantese McDonald
(74) *Attorney, Agent, or Firm*—Neal L. Slifkin; Robert C. Brown

(57) ABSTRACT

A system for dispensing magnetorheological fluid to an MR finishing machine includes a pump for pressurizing the system; a first magnetic valve for regulating MR fluid flow by magnetically varying the structure and apparent viscosity of the fluid through a first flow passage; a similar second magnetic valve magnetically controlling a second flow passage in line with the first valve and flow passage; a pressure sensor disposed between the first and second valves; and an electronic control means. MR fluid flow through the system is controlled to a predetermined flow rate solely by the first valve. When the second valve is deactivated, a reference pressure is determined and saved. When the second valve is activated, a second pressure is determined and saved. From the pressure difference, the solids concentration of the fluid is determined, and a computer algorithm adds a calculated amount of water to the fluid reservoir as needed. The second valve is deactivated, and the measurement cycle is repeated, as may be desired.

8 Claims, 4 Drawing Sheets

METHOD AND APPARATUS FOR MEASURING AND CONTROLLING SOLIDS COMPOSITION OF A MAGNETORHEOLOGICAL FLUID

RELATIONSHIP TO OTHER APPLICATIONS AND PATENTS

The present application is a Continuation-In-Part of a pending U.S. patent application Ser. No. 09/862,245, filed May 22, 2001.

BACKGROUND OF THE INVENTION

1. Field of the Invention

The present invention relates to methods and apparatus for measuring the solids concentration of a fluid suspension; and more particularly, to methods and apparatus for monitoring and controlling the concentration of magnetic particles in a magnetorheological fluid being used in a magnetorheological finishing apparatus.

2. Discussion of the Related Art

It is well known in the art of finishing and polishing surfaces to use, as a finishing agent, particulate fluid suspensions having magnetorheological properties. Such fluids, known as magnetorheological fluids (MR fluids), comprise magnetically soft particles, such as iron carbonyl, which can become oriented and magnetically linked into fibrils in the presence of a superimposed magnetic field, thereby increasing the apparent viscosity of the fluid by many orders of magnitude. Such increase is known as magnetic "stiffening" of the MR fluid. Non-stiffened, or magnetically relaxed, MR fluid can be stored and pumped as a low-viscosity fluid, having a viscosity typically of about 50 cp or less, then stiffened to a semi-rigid paste of about $10^5$ cp or more in a magnetic work zone for finishing or polishing, then relaxed again outside the work zone for collection, reconditioning, and reuse. Apparatus and methods for magnetorheological finishing and for delivery of MR fluids are disclosed in, for example, U.S. Pat. No. 5,951,369 issued Sep. 14, 1999 ('369) and No. 5,971,835 issued Oct. 26, 1999 ('835), and Published U.S. Patent Application No. 20020177392 ('392), all to Kordonski et al., the relevant disclosures of which are herein incorporated by reference.

MR fluid finishing apparatus typically includes a fluid delivery system (FDS) for dispensing MR fluid onto a rotating carrier surface, whereon the fluid is carried into and out of a work zone formed against the surface to be finished. MR fluid is a relatively unstable suspension because the magnetic particles tend readily to agglomerate and to settle out of suspension and thereby stagnate. Thus, a primary concern in configuring an FDS for MR fluid is keeping the fluid relatively homogeneous in the system, and very highly homogeneous at the point of dispensing into the work zone. An FDS must receive spent fluid from the work zone, recondition the fluid for reuse as by adjusting the temperature and viscosity, rehomogenize the adjusted fluid, and redispense the fluid into the work zone at a controlled flow rate. A suitable prior art FDS is disclosed in the '392 Publication.

MR fluid is a mixture of iron particles and carrier fluid, which, for example, can be water. The iron particles and water must be mixed and maintained in a certain proportion to maintain required magnetorheological and material removal properties throughout a polishing or finishing run, which can last up to several hundred hours. Evaporation of water causes a natural rise in solids concentration of the MR fluid as the fluid passes through the work zone, and also in the collection/mixing reservoir. To maintain a consistent solids concentration, water must be added to the fluid in the collection/mixing reservoir.

Preferably, some real-time means is provided to measure (monitor) iron particle concentration in the MR fluid. For example, in magnetorheological deterministic finishing (MRF), the concentration of iron particles must be precisely controlled in real time to provide the required stability and predictability of the material removal function.

One known approach to monitoring concentration is to continuously measure slurry viscosity, which is proportional to the solids concentration. For example, our '369 patent discloses a method wherein a flow rate and a pressure drop are measured along a capillary tube, and viscosity and concentration are inferred therefrom. Although this method can yield excellent results, several problems can be encountered. Pressure and flow rate must both be measured, and each may be subject to error. Temperature control is required. A relatively long (100×diameter) capillary tube is required to provide the needed accuracy, and changes in capillary tube internal geometry (clogging, sedimentation, wear) can lead to erroneous values. The apparent viscosity of MR fluids, being non-Newtonian, is a function of shear rate, which requires special means to correct measurements when flow rate changes.

Another known approach is disclosed in U.S. Pat. No. 6,650,108, wherein concentration of iron particles in MR fluid is inferred from measurement of fluid inductance and density. Again, several problems can be encountered in using this approach. The measurements of inductance and density have low sensitivity, meaning that the inferred concentration value has a large margin of error. The inductance-measuring coil can cause structuring of the MR fluid, and magnetic material may sediment on the walls of measuring cell, both resulting in erroneous concentration values. Density measurements using the Coriolis method are complex and expensive. Finally, the disclosure of this patent does not teach how to control and adjust concentration but attempts only to monitor actual values.

What is needed is an improved method and apparatus for measuring and controlling MR fluid solids concentration,
   wherein determined values are not sensitive to flow rate and temperature of the fluid, are not sensitive to variation in pipe geometry, and do not require a long and special capillary tube, and
   wherein the method and apparatus are easily adapted to provide in-line real time measurements and require simple hardware, including only one pressure gauge.

It is a primary objective of the invention to provide accurate, reliable, and inexpensive continuous, real-time measurement and control of iron particle concentration in a magnetorheological fluid.

SUMMARY OF THE INVENTION

Briefly described, a preferred embodiment of a system for dispensing magnetorheological fluid to an MR finishing machine includes a non-positive displacement pump for pressurizing the system; a first magnetic valve for regulating MR fluid flow by magnetically varying the structure and apparent viscosity of the fluid through a first flow passage; a similar second magnetic valve magnetically disposed in a second flow passage in line with the first valve and first flow passage; a pressure sensor disposed between the first and second valves; electronic flow control means for controlling the first valve; and computational means for controlling the second valve and processing data from the pressure sensor.

In operation, MR fluid flow through the system is always controlled to a predetermined flow rate solely by the first valve. During a reference interval, the second valve is deactivated, and a reference system pressure ("$P_{off}$") is determined and saved. During a test interval, the second valve is activated, and the first valve through the feed back loop appropriately adjusts to avoid appreciable change or upset in flow rate through the system. A test pressure ("$P_{on}$") is determined and saved. The pressure difference ("$\Delta P$") between the test pressure and the reference pressure is calculated and the solids concentration ("C") of the MR fluid is determined from a calibration expression having predetermined constants. The calculated solids concentration is compared to an aim concentration, and a computer algorithm adds a calculated amount of water to the MR fluid in the MR fluid reservoir. The system is again returned to first valve flow control and the measurement cycle may be repeated. Preferably, the repeat is immediately after completion of the previous cycle and continues throughout the operation run of the associated MR finishing machine.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

Figure 1:
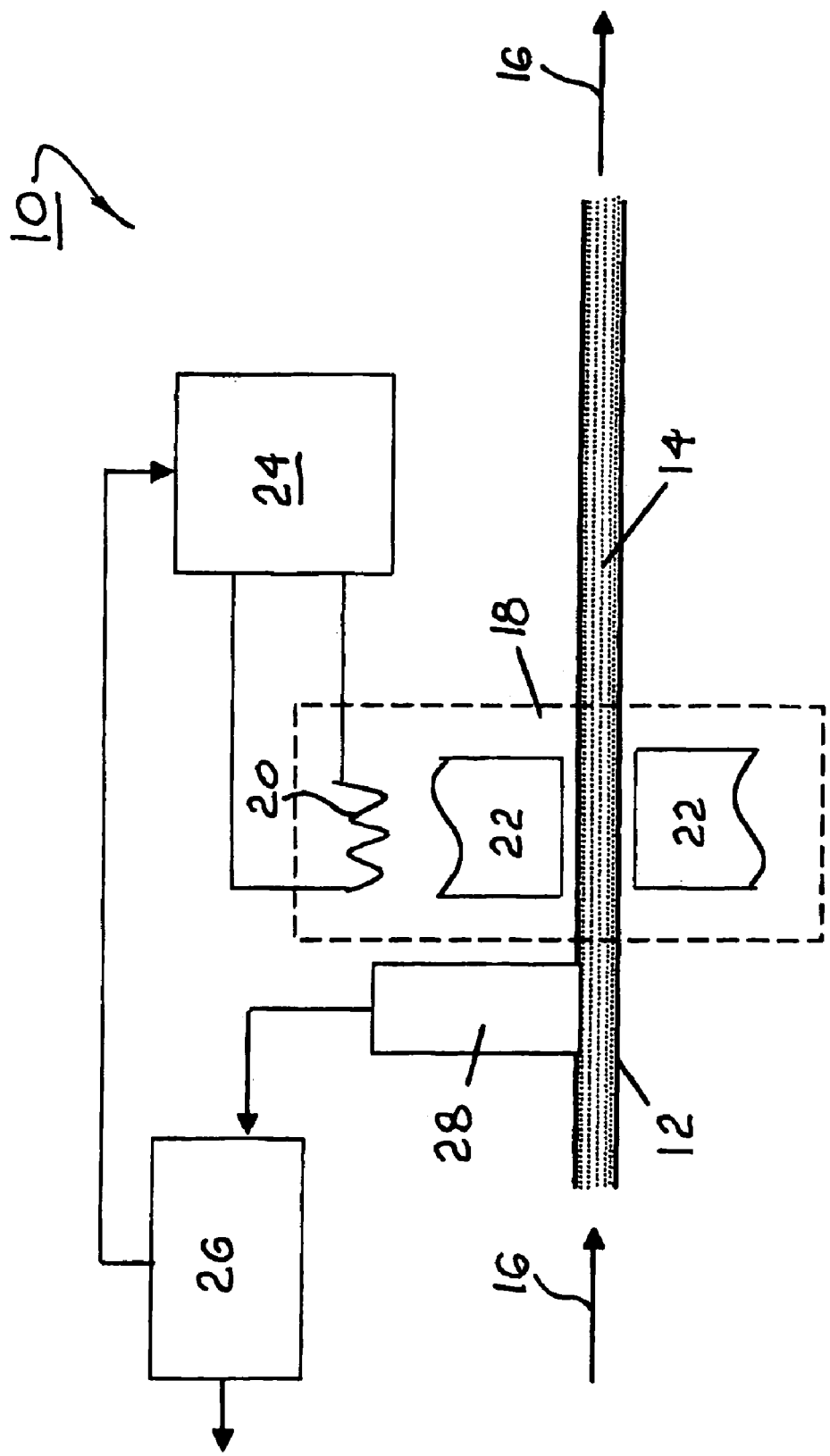
FIG. 1 is a schematic diagram of an inline system in accordance with the invention for monitoring and controlling iron particle concentration in a flowing MR fluid.

Referring to FIG. 1, a system 10 for measuring and adjusting by dilution the concentration of iron particles in a magnetorheological fluid includes a non-magnetic tube 12 for conveying a stream 14 of MR fluid 16 comprising a slurry of iron particles in a liquid. Stream 14 originates in a reservoir and pump, not shown in FIG. 1. An electromagnet 18 defines a magnetic flow control valve for variably stiffening a magnetorheological fluid passing therethrough to increase viscous drag of the fluid in the valve. Electromagnet 18 may comprise first and second pole pieces 22 disposed on opposite sides of tube 12. In a currently preferred embodiment, valve 18 comprises first and second magnet pole pieces 22 coaxially disposed and each having an axial passage therethrough, and electrical windings 20 connected to a power supply 24 for controllably providing a magnetic field within tube 12 disposed within the pole piece axial passages in response to energizing signals from computer 26. A pressure sensor 28 is disposed in stream 14 and provides input to computer 26 which further controls a water dripper 124 (FIG. 2) at the reservoir, as described more fully below.

In operation, a fixed flow rate of MR fluid is provided through tube 12. The computer switches the power supply on and off, thus alternately energizing and de-energizing electromagnet 18. Pressure in tube 12 is recorded in both states. Fibrils are formed in the MR fluid within the region of the electromagnet when the electromagnet is energized, thus increasing the apparent viscosity and hence the upstream pressure experienced by pressure sensor 28. The pressure difference is proportional to the concentration of iron particles in the flowing MR fluid. When the measured pressure difference exceeds a predetermined value, computer 26 calculates a dilution to be made in the reservoir and signals the water dripper to make the dilution.

Figure 2:
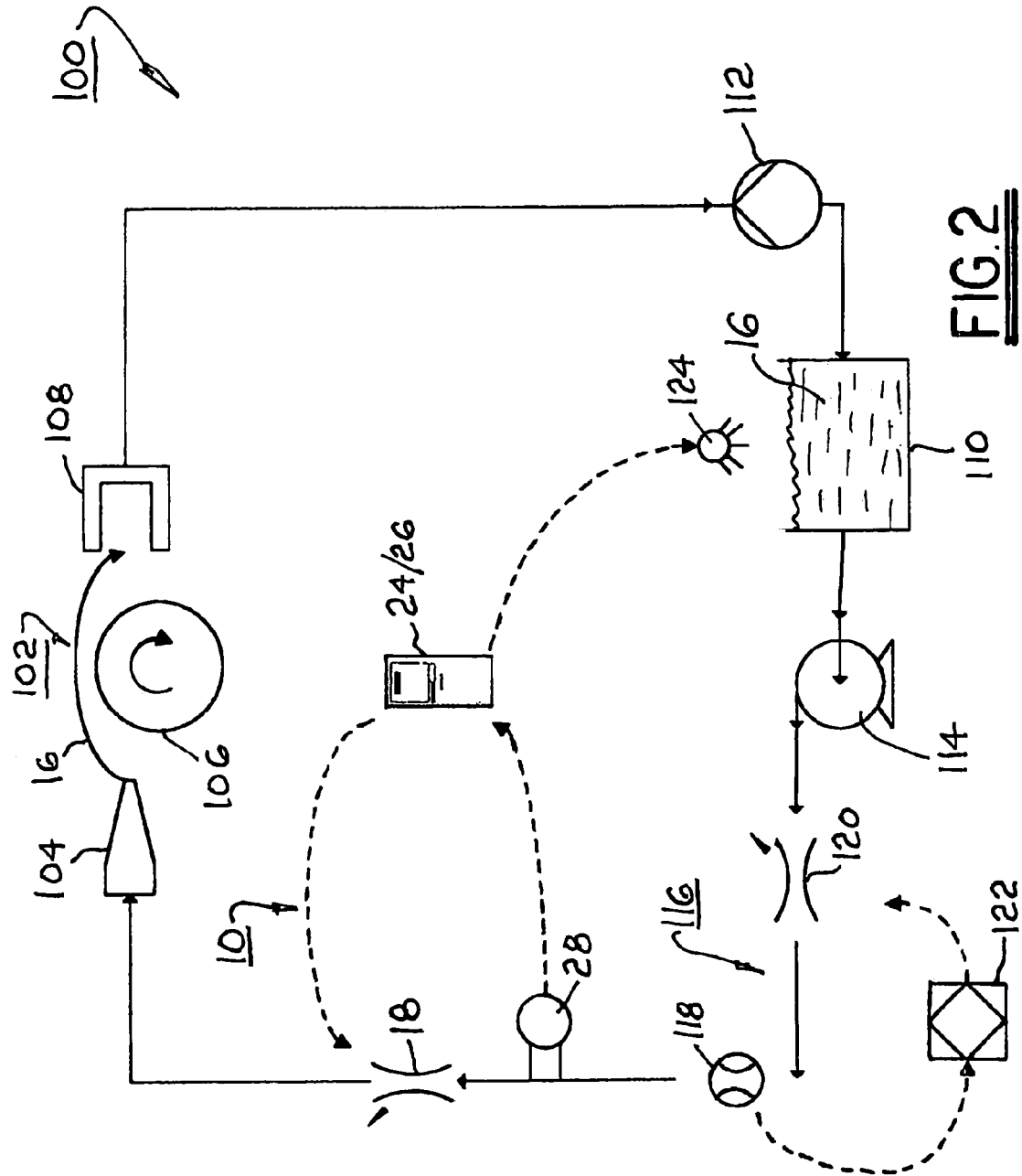
FIG. 2 is a simplified schematic diagram of an MR finishing machine including an MR fluid dispensing and concentration control system in accordance with the invention.

Referring to FIG. 2, an MR finishing system 100 includes the elements of system 10, disclosed operationally as follows. Beginning at work zone 102, MR fluid 16 is extruded from nozzle 104 onto a carrier wheel 106 for use in MR finishing and is then scraped off of wheel 106 by scraper 108 and returned to a reservoir 110 by a return pump 112, preferably a positive displacement pump, all in known fashion. From reservoir 110 to nozzle 104, MR fluid is regulated through system 100 by a flow control system 116. The flow control system may take the form of a centrifugal pump 114, a flowmeter 118, a first magnetic valve 120, and flow controller 122, disposed in a first portion of system 100, substantially as disclosed in the incorporated '392 Publication. Alternatively, flow control system 116 may comprise a positive displacement pump (not shown) having rotational speed controlled by a flow controller 122 as is well known in the prior art. Such a flow control system does not require magnetic valve 120. For purposes of discussion hereinbelow, the former system is employed.

A pressure sensor 28 is disposed downstream of flow control system 116. In a second portion of system 100 between pressure sensor 28 and nozzle 104 is disposed a system 10 for measuring and controlling the iron solids content of MR fluid 16, including a second magnetic valve 18 for intermittently stiffening MR fluid 16 passing therethrough, a computer 26, and a water dripper 124.

Figure 3:
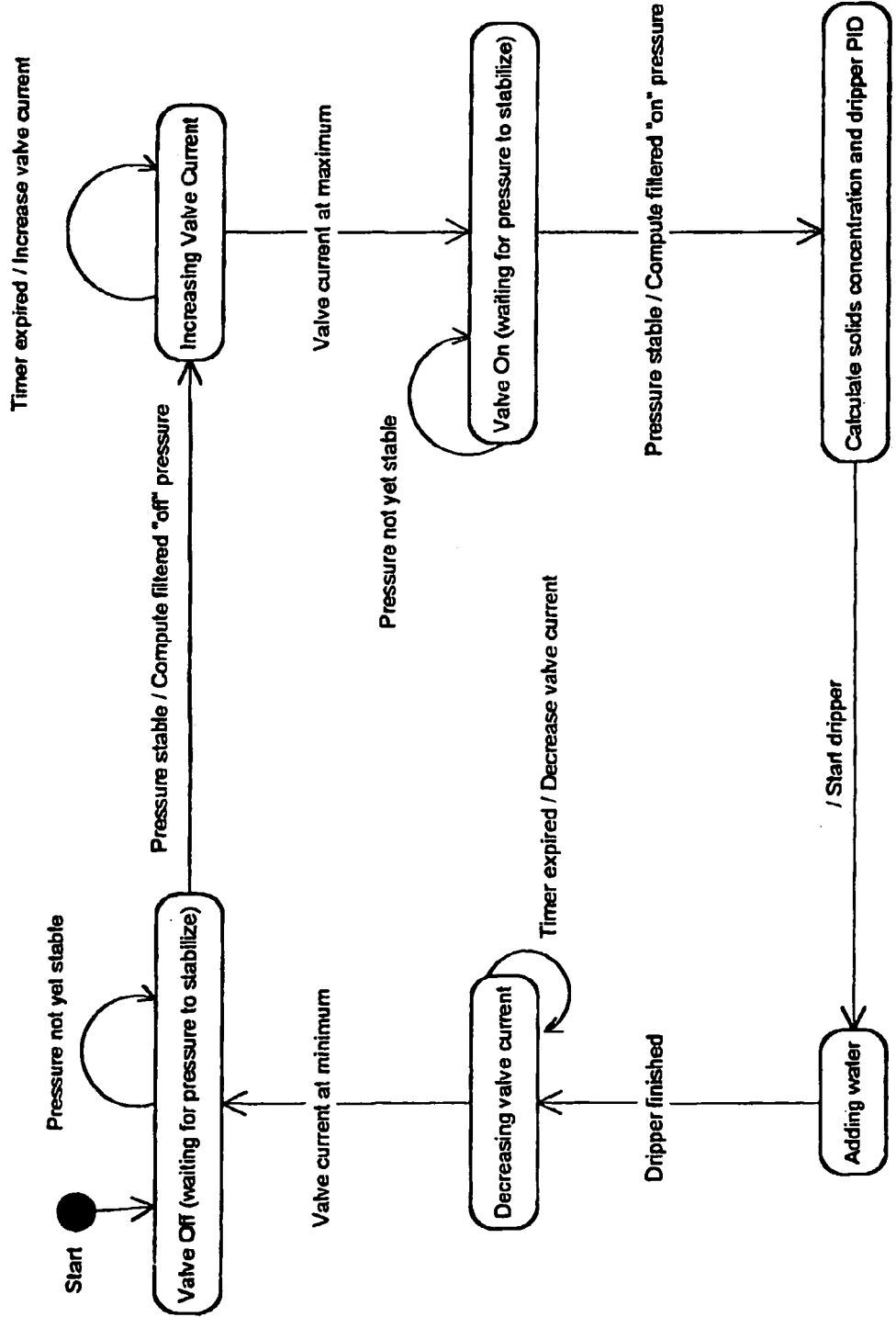
FIG. 3 is a schematic diagram of an algorithm for solids concentration measurement and control.
Figure 4:
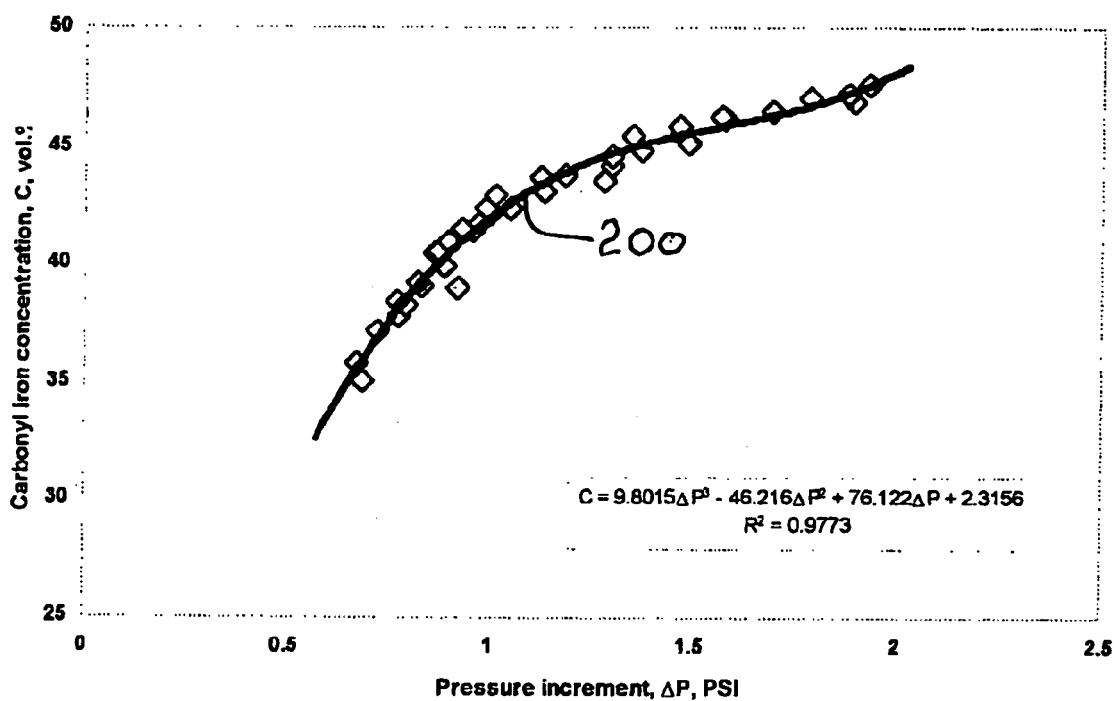
FIG. 4 is an exemplary calibration curve for use with the inline solids measurement and control system shown in FIGS. 1 and 2.

Referring to FIGS. 3 and 4, in operation, initially second valve 18 is turned off (0 ma current), and flow through nozzle 104 is controlled conventionally via flow control system 116. Controller 122 provides current, preferably between 0 mA and 1000 mA, to first valve 120 to satisfy the setpoint of flowmeter 118. When flow is stabilized at the desired flowrate, the software in computer 26 takes periodic readings from pressure sensor 28 which are then low-pass filtered using a finite impulse response (FIR) filter. After pressure is stabilized, the stable reference pressure value ($P_{off}$) is stored.

After a programmed interval, the current to second valve 18 is gradually increased by computer 26, causing the pressure experienced by sensor 28 to gradually increase. Flow meter 118 recognizes an incipient change (decrease) in flow rate and controller 122 begins to reduce the current to first valve 118 to maintain constant flow through system 100. The time constant at which second valve current is increased by the software is selected to be slow enough that the net change in flow at the nozzle is negligible. The current to second valve 18 is increased to a maximum of, preferably, about 250 mA. Once the second valve current has reached its maximum, the algorithm again waits for the pressure at sensor 28 to stabilize at the new, high level, then saves the high level test pressure ($P_{on}$), and determines the pressure difference ($\Delta P$) between $P_{on}$ and $P_{off}$.

Referring to FIG. 4, a typical calibration curve 200 for a given system 100 shows the carbonyl iron concentration (C)

as a function of ΔP. For any given system 100, calibration data may be taken and fitted to a best-fit curve of the form $$C = a\Delta P^3 + b\Delta P^2 + c\Delta P + k \tag{Eq. 1}$$

in known fashion to provide the coefficients a, b, and c, and intercept k. In the example shown in FIG. 4, the best-fit expression is $$C = 9.8015\Delta P^3 - 46.216\Delta P^2 + 76.122\Delta P + 2.3156 \tag{Eq. 2}$$

where C is in carbonyl iron volume percent and pressure is in psi.

After computing the actual solids concentration in MR fluid 16, computer 26 uses a PID control algorithm to determine the amount of water to add to collection/mixing tank 110 to maintain the solids concentration setpoint ($SC_{setpoint}$) and then commands water dripper 124 to begin to add the water.

After the water is added and the mixture in tank 110 is stirred to homogeneity, computer 26 begins to turn off second valve 18 by reducing the current provided thereto. As before, the flow control system 116 senses an incipient change in flowrate (increase) and begins to close first valve 120 to compensate and maintain a constant flowrate. The current to second valve 18 is gradually reduced to 0 Ma. Once the current to first valve 120 is stabilized for the desired flowrate, system 100 has completed one cycle of solids measurement and adjustment. A new value of $P_{off}$ is saved, and a new cycle of measurement and adjustment is begun.

From the foregoing description it will be apparent that there has been provided an improved delivery system for magnetorheological fluid. Variations and modifications of the herein described fluid delivery system will undoubtedly suggest themselves to those skilled in this art. Accordingly, the foregoing description should be taken as illustrative and not in a limiting sense.

What is claimed is:

1. A system for measuring solids concentration in a magnetorheological fluid, comprising:
   a) means for passing said magnetorheological fluid through said system at a fixed flow rate;
   b) an inline pressure sensor disposed downstream of said means for passing;
   c) a magnetic valve disposed downstream of said inline pressure sensor;
   d) control means for controlling the action of said magnetic valve between first and second predetermined states of actuation;
   e) computer means connected to said inline pressure sensor for obtaining first and second inline pressure measurements corresponding to said first and second states of valve actuation, and for using the difference between said first and second pressure measurements to calculate solids concentration in said magnetorheological fluid.

2. A system in accordance with claim 1 wherein said first predetermined state is a de-energized state and said second predetermined state is an energized state.

3. A system in accordance with claim 1 wherein said means for passing includes a centrifugal pump, a flowmeter, and a flow controller.

4. A system in accordance with claim 1 for controlling said calculated solids concentration to a predetermined aim, comprising:
   a) a reservoir for holding a supply of said magnetorheological fluid and for supplying said fluid to said pump means;
   b) means for using said calculated solids concentration to determine an amount of diluent to be added to said reservoir to adjust said calculated solids concentration to said predetermined aim concentration; and
   c) means for adding said amount of diluent to said fluid in said reservoir.

5. A system for magnetorheological finishing of a substrate surface by impinging a magnetically stiffened magnetorheological fluid thereupon, comprising:
   a) a carrier wheel disposed adjacent said substrate surface for creating a work zone therebetween;
   b) nozzle means for dispensing said magnetorheological fluid onto said carrier wheel for transport into said work zone;
   c) magnet means adjacent said carrier wheel for creating a magnetic field to stiffen said fluid within said work zone;
   d) a fluid delivery system for receiving spent magnetorheological fluid from said carrier wheel, reconstituting said fluid, and supplying said reconstituted fluid to said nozzle means,
   wherein said fluid delivery system includes means for measuring and controlling solids concentration in said magnetorheological fluid.

6. A system in accordance with claim 5 wherein said means for measuring and controlling solids concentration in said magnetorheological fluid comprises:
   a) means for passing said magnetorheological fluid through said system at a fixed flow rate;
   b) an inline pressure sensor disposed downstream of said means for passing;
   c) a magnetic valve disposed downstream of said inline pressure sensor;
   d) control means for controlling the action of said magnetic valve between first and second predetermined states of actuation;
   e) computer means connected to said inline pressure sensor for obtaining first and second inline pressure measurements corresponding to said first and second states of valve actuation, and for using the difference between said first and second pressure measurements to calculate solids concentration in said magnetorheological fluid;
   f) a reservoir for receiving spent magnetorheological fluid from said carrier wheel and for supplying said fluid to said means for passing;
   g) means for using said calculated solids concentration to determine an amount of diluent to be added to said reservoir to adjust said calculated solids concentration to a predetermined aim concentration; and
   h) means for adding said amount of diluent to said fluid in said reservoir.

7. A method for measuring solids concentration in a magnetorheological fluid, comprising the steps of:
   a) providing a measurement system including means for passing said magnetorheological fluid through said system at a fixed flow rate, an inline pressure sensor disposed downstream of said means for passing, a magnetic valve disposed downstream of said inline pressure sensor, control means for controlling the action of said magnetic valve between first and second predetermined states of actuation, and computer means connected to said inline pressure sensor for obtaining first and second inline pressure measurements corresponding to said first and second states of valve actuation, and for using the difference between said first and second pressure measurements to calculate solids concentration in said magnetorheological fluid;

b) delivering said magnetorheological fluid through said system;

c) determining a reference pressure value when said magnetic valve is in said first predetermined state;

d) determining a test pressure value when said magnetic valve is in said second predetermined state;

e) calculating a difference between said test and reference pressure values;

h) providing a system calibration curve of solids concentration as a function of difference between said test and reference pressure values; and i) applying said difference to said system calibration curve to determine said solids concentration in said magnetorheological fluid.

8. A method in accordance with claim 7 for controlling said solids concentration to a predetermined aim value, comprising the steps of:

a) providing a reservoir for supplying said magnetorheological fluid to said means for passing, and means for adding diluent to said magnetorheological fluid in said reservoir;

b) using said calculated solids concentration to determine an amount of diluent to be added to said reservoir to adjust said calculated solids concentration to said predetermined aim value; and c) adding said amount of diluent to said fluid in said reservoir.

* * * * *